United States Patent [19]

Doninelli

[11] Patent Number: 5,758,837
[45] Date of Patent: Jun. 2, 1998

[54] TAPE CASSETTE WITH ANTI-STICKTION MECHANISM

[75] Inventor: Peter D. Doninelli, Morgan Hill, Calif.

[73] Assignee: Xerox Corporation, Stamford, Conn.

[21] Appl. No.: 887,004

[22] Filed: Jul. 2, 1997

[51] Int. Cl.$^6$ ................................. G11B 23/087
[52] U.S. Cl. ................... 242/346.1; 242/338.3; 242/343
[58] Field of Search ............... 242/338.1, 338.3, 242/343, 343.1, 343.2, 346, 346.1, 615.1, 615.3; 360/130.21

[56] References Cited

U.S. PATENT DOCUMENTS

| | | | |
|---|---|---|---|
| 4,170,407 | 10/1979 | Stella | 242/346.1 |
| 4,238,088 | 12/1980 | Schoettle et al. | 242/615.1 |
| 4,337,909 | 7/1982 | Harja | 242/346.1 |
| 4,741,496 | 5/1988 | Mizutani et al. | 242/346.1 |
| 5,449,124 | 9/1995 | Fujii | 242/343.2 |

*Primary Examiner*—John P. Darling

[57] ABSTRACT

A tape cassette has a tape extending from one tape reel around a tape engagement area of the periphery of a guide member and to another tape reel when the tape is in a normal operating position when the cassette is in a tape drive. The cassette includes a tape lift off mechanism which is mounted for rotatable movement around the periphery of the guide member from the normal tape operating position, where the tape lift off mechanism is out of contact with said tape, to a tape storage position where the tape lift off mechanism engages the tape and disengages the tape from at least a portion of the tape engagement area of the guide member when the cassette is removed from the tape drive. In addition to the tape lift off mechanism, a brake mechanism is provided that engages flanges of both tape reels when the cassette is removed from the tape drive to prevent the reels from rotating during storage of the cassette. The brake mechanism is connected to the tape lift off mechanism and is moved by the tape lift off mechanism into engagement with the flanges of both reels when the tape lift off mechanism lifts the tape from the tape guide when the cassette is removed from the tape drive. The brake mechanism is permitted by the tape mechanism to move away from the flanges when the cassette is inserted into the tape drive.

23 Claims, 6 Drawing Sheets

５,７５８,８３７

TAPE CASSETTE WITH ANTI-STICKTION MECHANISM

BACKGROUND

This invention relates to a high speed optical tape cassette. The cassette has a single tape guide located between two tape reels on which a tape is partially wrapped when being transported between the reels. A read access opening is located opposite the tape guide, which allows an optical reader to access information on the optical tape that passes over the tape guide so the tape can be read.

Under certain temperature and humidity conditions, tapes can adhere to any surface so strongly that trying to move the tape in any direction will damage it. The adhering force can be so great it will stall motors or break the tape. In most cases, the least that will happen is the tape will stretch, ruining the tape. This problem can also happen when the tapes are stored and can be a major problem in single guide cassette design.

SUMMARY OF INVENTION

A tape cassette is provided with a tape lift off mechanism that, when in a tape storage position, lifts the tape from a tape guide when the tape cassette is removed from a tape drive and, when the cassette is inserted into the tape drive, allows the tape to engage the guide when the tape cassette is inserted into the tape drive.

In addition to the tape lift off mechanism, a brake mechanism is provided that engages flanges of both tape reels when the cassette is removed from the tape drive to prevent the reels from rotating during storage of the cassette. The brake mechanism is connected to the tape lift off mechanism and is moved by the tape lift off mechanism into engagement with the flanges of both reels when the tape lift off mechanism lifts the tape from the tape guide as the cassette is removed from the tape drive. The brake mechanism is permitted by the tape lift off mechanism to move away from the reel flanges when the cassette is inserted into the tape drive.

DETAILED DESCRIPTION OF INVENTION

Figure 1:
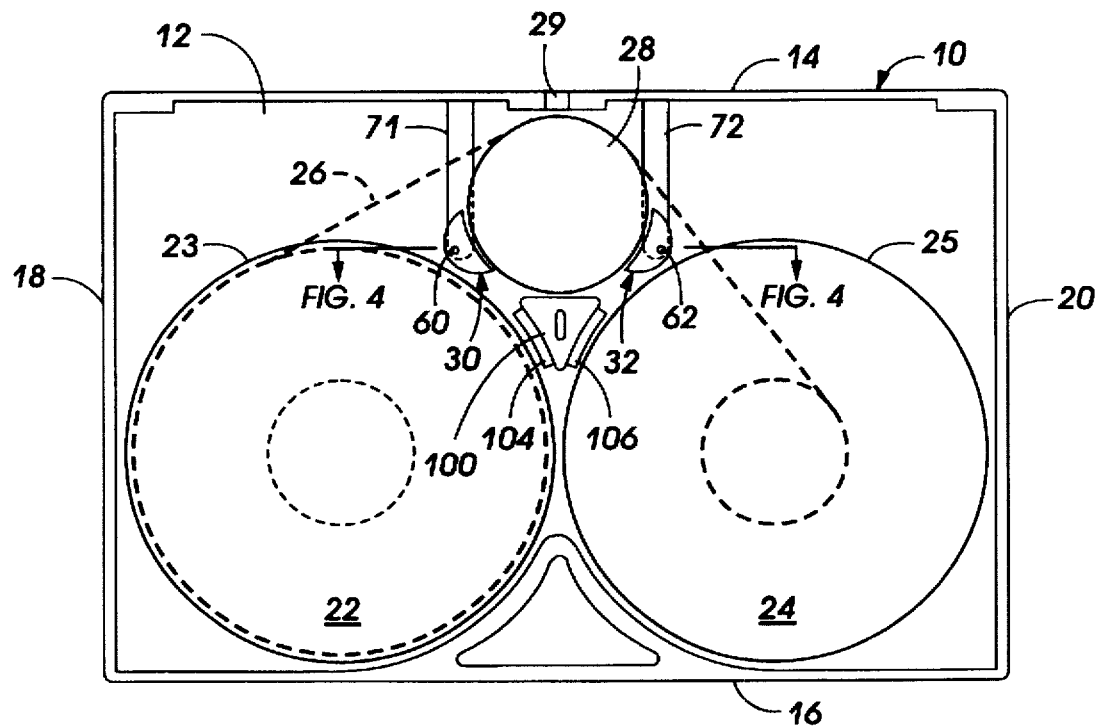
FIG. 1 is a top cutaway view of a tape cassette showing tape lift off members and a brake for tape reels in a tape operating position.

Referring to FIG. 1, a top view of a tape cassette 10 is shown. The tape cassette comprises generally a closed housing which has a bottom wall or base plate 12 and a top wall which is not shown in this view for simplicity, a front wall 14, a rear wall 16 and two side walls 18 and 20.

A tape reel 22 and a tape reel 24 are rotatably mounted on the bottom wall 12. The reels 22 and 24 each have guide flanges 23 and 25, respectively, for guiding the tape onto the reels. Optical tape 26 is wound on the tape reel 22 and extends across a tape guide 28 onto the tape reel 24. A pair of tape lift off members 30 and 32 are rotatably mounted on the base plate 12 for rotation about the center of the tape guide 28 to lift the tape 26 from the surface or tape engagement area of the tape guide 28. An opening 29 is located in the front wall opposite the tape guide 28 for access to the tape by an optical reader.

Figure 2:
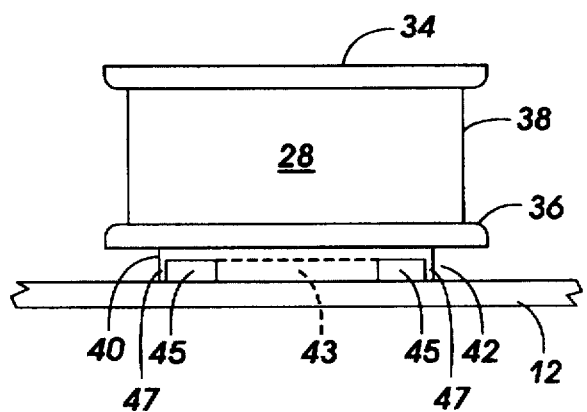
FIG. 2 is a rear view of a tape guide of the tape cassette.
Figure 5:
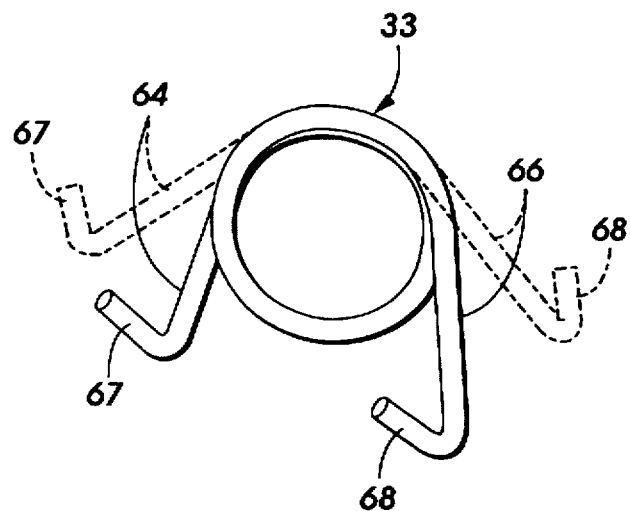
FIG. 5 is view of a torsion spring which acts on the tape lift off members shown in previous FIGS. 1, 3 and 4.

Referring to FIG. 2, the tape guide 28 is a one piece machined metal member having an upper annular flange 34, a bottom annular flange 36 and a center portion 38. The flanges are spaced apart from each other a distance which is slightly more than the width of the tape 26 to allow vertical movement of the tape 26 between the flanges 34 and 36. At the bottom of the tape guide 28 is machined a circular spacer portion 40 which is of a diameter that is smaller than the diameter of the flange 36 to provide an annular space 42 to receive the pair of lift off members 30 and 32 and an annular torsion spring 33 (FIG. 5). An inner recess 43 is provided in the spacer portion 40 to receive the torsion spring 33 and two openings 45 are provided along the wall 47 of the recess for a purpose to be described later. The tape guide 28 can be secured to the base plate 12 by any well known means to prevent movement of the guide 28 relative to the base plate.

Figure 3:
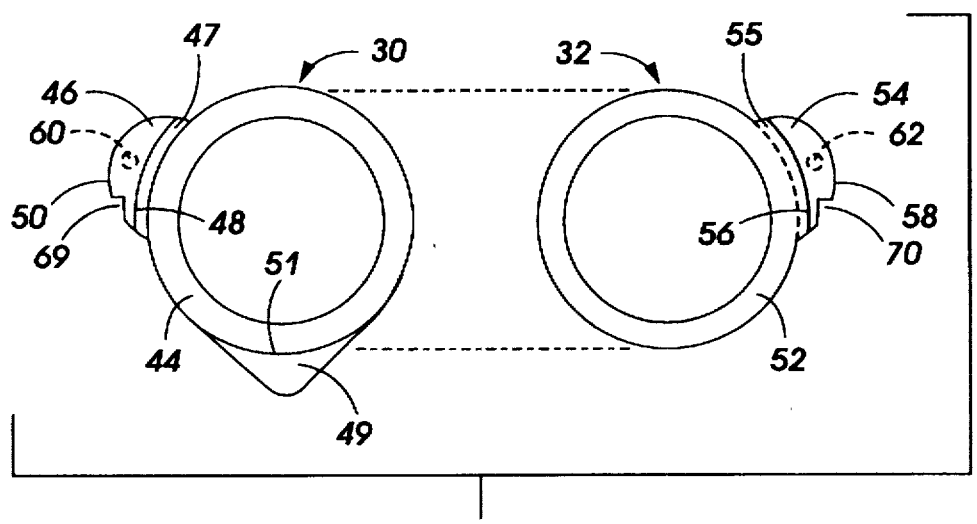
FIG. 3 is a top view of each tape lift off member of the tape cassette.
Figure 4:
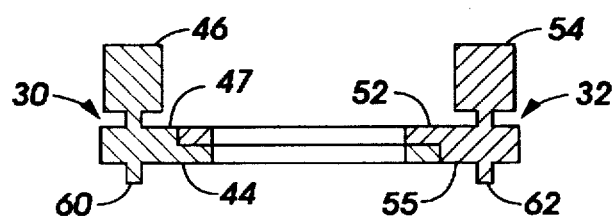
FIG. 4 is a simplified cross sectional view of the tape lift off members taken along section line 4—4 of FIG. 1.

Referring to FIGS. 3 and 4, the lift off member 30 comprises an annular base member 44 and an ear 46. A raised portion 47 is integral with and extends in a direction radially outwards from the annular base member 44 and the ear 46 extends upwardly from the raised portion 47. The inner surface 48 of the ear 46 has the shape of an arc which has the same center as the tape guide 28 so the lift off member 30 can freely rotate about the tape guide 28. The outer surface 50 of the ear 46 is curved to allow gradual and curved contact with the tape 26 when the ear 46 is moved into engagement with the tape 26. A pointed tip 49 (the purpose of which will be explained later) extends outwardly from the periphery of the base member 44 of tape lift off member 30. The tip 49 is raised from the base member 44 forming a raised edge 51 with the base member 44.

The lift off member 32 comprises an annular base member 52 and an ear 54. A portion 55 is integral with and extends in a direction radially outwards from and downwards from the annular base member 52 and the ear 54 extends upwardly from the portion 55. The inner surface 56 of the ear 54 has the shape of an arc which has the same center as the tape guide 28 so the lift off member 32 can freely rotate about the tape guide 28. The outer surface 58 of the ear 54 is curved to allow gradual and curved contact with the tape 26 when the ear 54 is moved into engagement with the tape 26. The ears 46, 54 have a vertical depth which is slightly larger than the full width of the tape 28 to ensure lifting support of the full width of the tape 26. Posts 60 and 62 extend downwardly from the base members 44 and 52, respectively, in the region of the ears 46 and 54 for a purpose to be described later. The lift off members 30 and 32 may be a one piece metal or plastic molded material. The outer surface 50 of ear 46 and the outer surface 58 of ear 54 can contain grooves extending parallel to the base plate 12 to reduce the surface area in contact with the tape 26.

Each base member 44, 52 of the lift off members 30, 32 has an annular opening of such a dimension that it will receive therethrough the spacer 40 of the tape guide 28. Referring to FIG. 4, the base 52 of the lift off member 32 sits on top of the base 44 of the lift off member 30 and the ear 46 is raised further away from its base 44 than the ear 54 is raised from its base 52 so the ears are at the same elevation relative to the base plate 12. The lift off members 30, 32 can rotate in opposite directions relative to each other. The edges of the raised portion 47 on base member 44 and the downwardly extending portion 55 on the base member 52 and the edge 51 (FIG. 3) of the raised tip 49 are engaged by the outer periphery of the opposite base member to align the base members during assembly.

Figure 6:
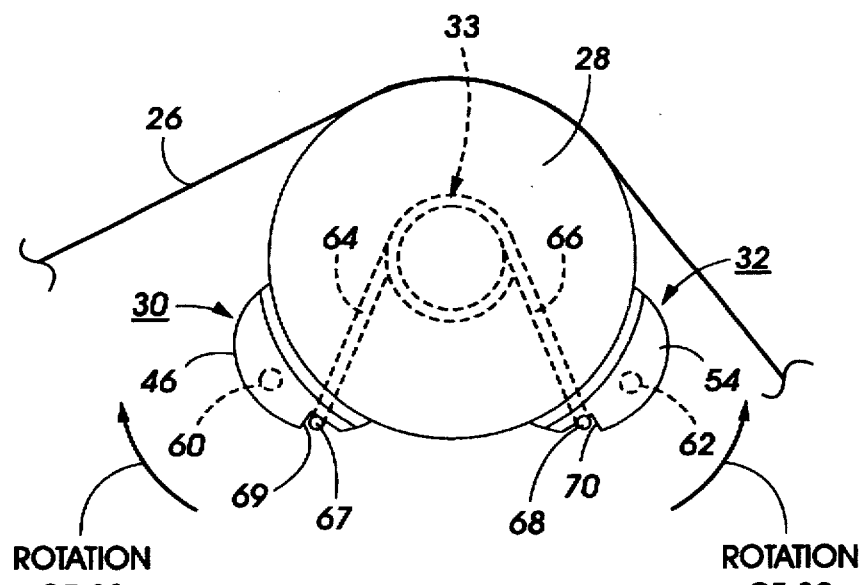
FIG. 6 is a top view of the torsion spring and tape lift off members as assembled around the tape guide.

Referring to FIGS. 5 and 6, the annular torsion spring 33 has a pair of arms 64, 66 having end tabs 67, 68 extending upwards. The torsion spring 33 is of such dimension that it will fit inside the inner recess 43 in the spacer portion 40 and the arms 64 and 66 will extend through the openings 45 in the wall of the recess 43 so the tabs can engage in slots 69, 70 of a respective ear 46, 54. Referring back to FIG. 5, the spring 33 is depicted in solid lines in its tape operating position and depicted in dashed lines in its tape storage position. The dimension of the openings 45 is sufficient to allow the arms 64, 66 to move from the spring tape operating position to the spring tape storage position. The spring 33 is at its maximum tension in its tape operating position and in this position the arms 64, 66 bias the lift off members 30, 32 towards their tape storage positions.

Figure 7:
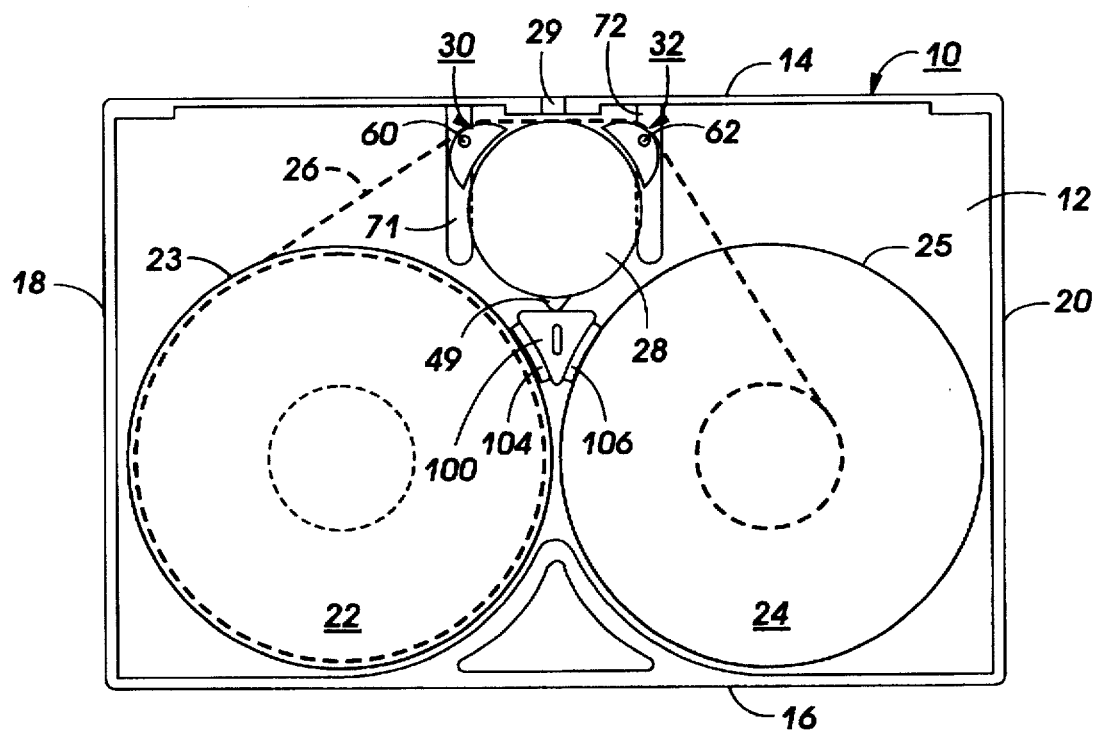
FIG. 7 is the same view of the tape cassette as in FIG. 1, only the tape lift off members and the brake for the tape reels are in a tape storage position.

In assembly, the base 52 of lift off member 32 is placed on top of base 44 of lift off member 30 and the openings in the lift off base members 44, 52 are aligned with each other, the spacer portion 40 of the tape guide 28 is inserted through the lift off members and then the torsion spring 33 is inserted into the recess 43. The tabs 67, 68 of the arms 64 and 66, which extend out of the recess 43, are inserted into their respective slots 69 and 70 of the ears 46 and 54 and then the tape guide 28 is secured onto the base plate 12 by any well known means to prevent movement of the guide 28 relative to the base plate. The torsion spring and the lift off members are arranged that the end tabs 67, 68 urge the lift off member 30 to rotate in a clockwise direction and urge the lift off member 32 to rotate in a counter clockwise direction to a lift off member tape storage position as shown in FIG. 7.

Referring back to FIG. 1, a pair of spaced parallel slots 71, 72 are provided in base plate 12. The post 60 of the lift off member 30 extends into the slot 71 and the post 62 of the lift off member 32 extends into the slot 72. The slots are approximately 0.035 inch deep and are of such a width to allow each post to move in an arcade path within its respective slot.

When the lift off members 30, 32 rotate toward the tape storage position shown in FIG. 6 due to the urging force of the torsion spring 33, they will rotate until the posts 60, 62 engage the edge of their repective slot at which point the tape lift off members can no longer be rotated in that direction and are in the tape storage position. As the tape lift off members rotate toward the tape storage position, the ears 46, 54 will engage the tape 28 on opposite sides of the tape guide 28 and lift the tape sufficiently off of the tape engagement area on the tape guide 28 to prevent any sticking forces to build up when the tape cassette is not being used. Preferably, the tape will be lifted either entirely or substantially off the tape engagement area on the tape guide 28.

Figure 8:
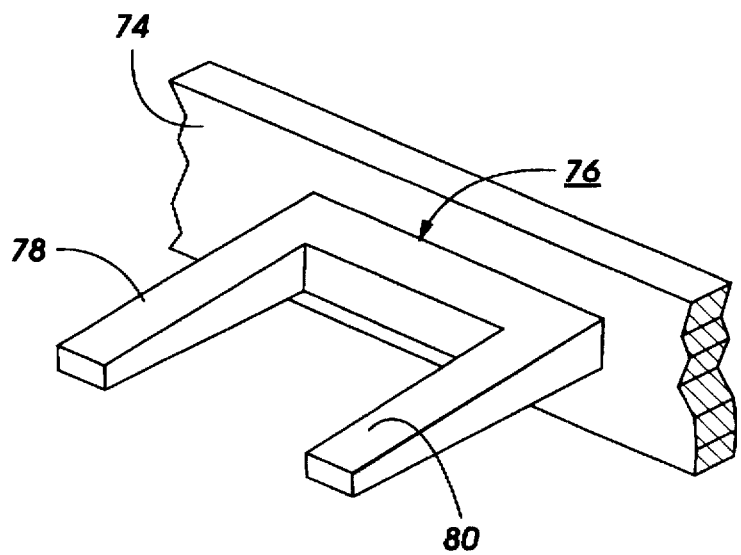
FIG. 8 is a simplified view showing a load blade connected to a tape drive frame.
Figure 9:
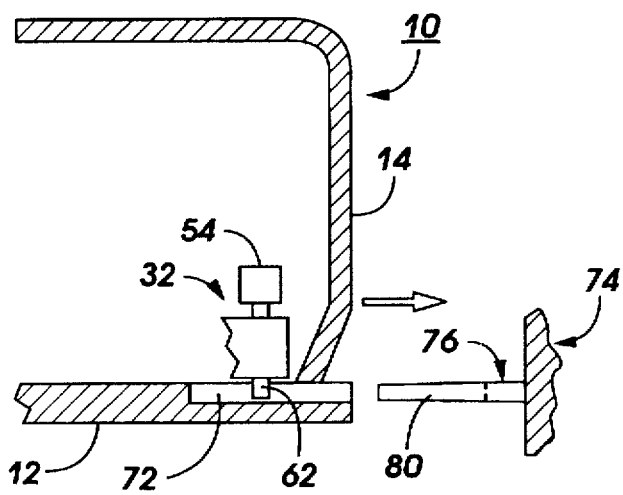
FIG. 9 is a simplified sectional side view showing the cassette of FIG. 1 about to engage the load blade when the cassette is inserted into the tape drive.

Referring to FIG. 8, a tape drive is shown generally as a block 74 and can be any well known tape drive. A generally "C" shaped actuator 76 is fixedly secured to the drive. The actuator 76 has two parallel spaced apart load blades 78 and 80 which extend from the tape drive 74 and are arranged to fit into the slots 71 and 72 on the base plate 12, respectively, when the tape cassette (which has its tape lift off members 30, 32 in the tape storage position as shown in FIG. 7) is inserted into the tape drive. The thickness of the blades is approximately 0.030 inch. The load blades 78, 80 are long enough to slide into the slots 71, 72 and engage the posts 60, 62 and move, against the urging force of the torsion spring 33, each post further inwards in an arcade path into its corresponding slot. This action will move the tape lift off members 30, 32 completely out of engagement with the tape 28, permitting the tape to contact the tape engagement area on the tape guide 28, to its tape operating position as shown in FIG. 1. When the cassette is removed from the tape drive 74, the torsion spring 64 will urge and move the tape lift off members 30, 32 back to its tape storage position shown in FIG. 7.

Figure 11:
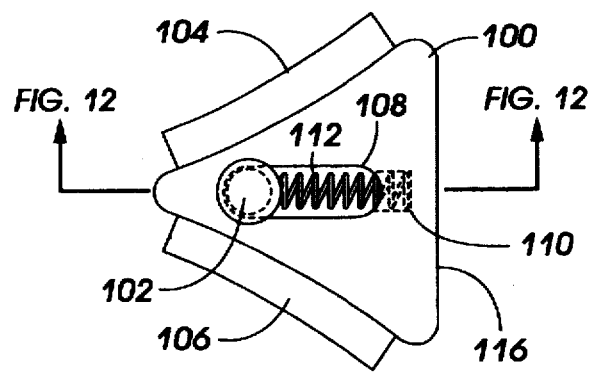
FIG. 11 is a view of the brake taken along section line 11—11 of FIG. 10.
Figure 10:
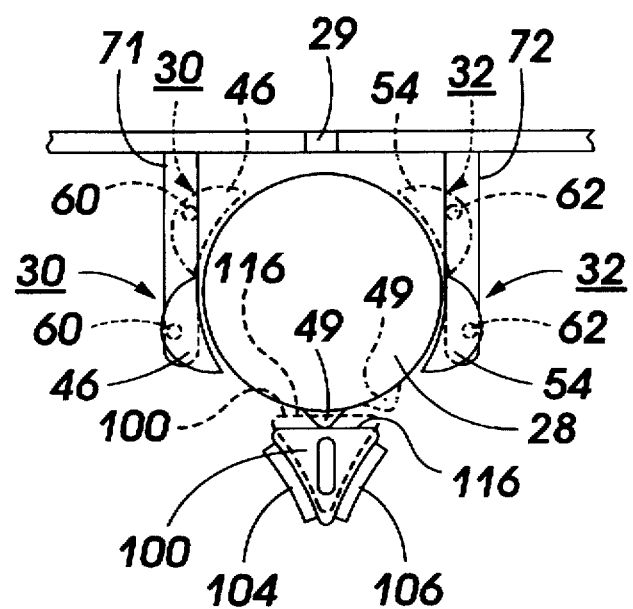
FIG. 10 is an enlarged view of the brake shown in FIGS. 1 and 6.

A brake can be added to the tape lift off mechanism of this invention to prevent rotation of the tape reels during storage. Referring to FIGS. 1, 7, and in particular to FIGS. 10 and 11, a brake member 100 is slidably mounted on a shoulder pin 102 which is attached to the base plate 12. A pair of brake pads 104 and 106 are fixed to the brake member 100 for engagement with the flanges 23, 25 of the tape reels 22 and 24, respectively. The brake member has an elongated slot 108 into which the shoulder pin 102 extends. A recess 110 is provided in the brake member at one end of the elongated slot 108, and receives one end of a light compression spring 112 therein. The other end of the compression spring is received in a recess 113 in the shoulder pin 102. The compression spring 112 is of a force just enough to move the brake member in the direction of the tape guide 28 into a brake tape operating position as shown in FIG. 1.

Figure 12:
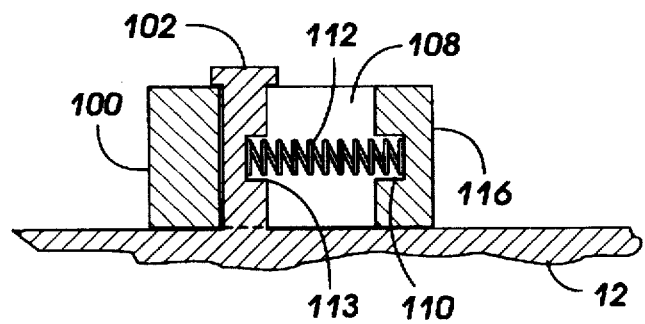
FIG. 12 is a simplified top view of the tape guide, tape lift off members and brake showing the tape lift off members and brake mechanism in a tape operating position and a tape storage position.

Referring back to FIG. 3, the tip 49 is of such a dimension that upon rotation (clockwise direction) of the tape lift off member 30 from its tape operating position to its tape storage position, the tip 49 will engage the surface 116 of the brake member 100 and move the brake member in a direction away from the tape guide 28 toward the tape reels to the brake tape storage position wherein the pads 104 and 106 are brought into engagement with the flanges 23 and 25 of the tape reels 22 and 24, respectively, for keeping the reels from rotating when the tape cassette 10 is not being used. FIG. 12 illustrates the relative positions of the tape lift off members 30, 32 and the brake member 100 with the solid lines depicting the lift off members 30, 32 and the brake member 100 in their tape storage positions and dashed lines depicting the lift off members 30, 32 and the brake member 100 in their tape operating positions.

In operation, upon insertion of the tape cassette into the tape drive 74, the load blades 78 and 80 will move the tape lift off members 30, 32 from the tape storage position to the tape operating position thereby moving tape lift off member 30 in a counter clockwise direction. This causes tip 49, carried by the tape lift off member 30, to move away from the surface 116 of the brake member 100 allowing the force of compression spring 112 to move the brake member in the direction towards the tape guide 28 sufficiently to disengage the pads 104, 106 from the flanges 23 and 25 of the reels 22 and 24, respectively. Upon the removal of the tape cassette from the tape drive 74, the torsion spring 64 will move the tape lift off members 30, 32 to the tape storage position thereby moving the tape lift off member 30 in the clockwise direction which causes tip 49 to move into engagement with the surface 116 of the brake member 100. The force of the torsion spring 33 is stronger than the force of the compression spring 112 and therefore the force of the torsion spring 33 overcomes the force of the compression spring 112 to cause tip 49 to move the brake member 100 in a direction away from the tape guide 28 toward the tape reels to the tape storage position to bring the pads 104 and 106 into engagement with the flanges 23 and 25 of tape reels 22 and 24, respectively to prevent rotation of the reels during storage.

While the invention has been described in relation to an optical tape cassette, the invention is equally applicable to any type of cassette. Also, the embodiment disclosed utilizes tape lift off members which are mounted to rotate about the periphery of the tape guide member. The lift off members do not have to rotate about the periphery of the tape guide members as the principle of this invention can also be carried out by confining tape lift off members to move in a path defined by individual slots. In this case the lift off members will be spring biased to their tape storage position and when the cassette is inserted into a tape drive, the lift off members will be moved along their respective slots by drive load blades to disengage from the tape.

I claim:

1. A tape cassette comprising:
   a housing,
   two tape reels rotatably mounted on said housing,
   a guide member mounted on said housing and having a tape engagement area on its periphery,
   tape extending from one of said tape reels around said tape engagement area of said guide member and to the other of said tape reels when said tape is in a normal operating position,
   tape lift off means mounted on said housing,
   said tape lift off means being so constructed and arranged to move from a given position when said tape is in said normal operating position to a tape storage position where the tape lift off means disengages said tape from at least a portion of said tape engagement area of said guide member, and
   means urging said tape lift off means into said tape storage position.

2. The tape cassette as recited in claim 1 wherein said tape lift off means is rotatably mounted on said housing for rotatable movement around the periphery of said guide member from said given position to said tape storage position.

3. The tape cassette as recited in claim 2 wherein said tape lift off means comprises a pair of tape lift off members rotatably mounted on said housing for rotatable movement in opposite directions around the periphery of said guide member.

4. The tape cassette as recited in claim 3 wherein said pair of tape lift off members are mounted on the said housing for rotatable movement in opposite directions about a common axis.

5. The tape cassette of claim 1 further comprising:
   brake means mounted on said housing for movement into engagement with at least one reel when said brake means is in a tape storage position and for movement out of engagement with said at least one reel when said brake means is in a tape operating position, and
   means, including means operatively connecting said tape lift off means to said brake means, to effect said movement of said brake means when said tape lift off means is moved to its tape storage position and is moved away from its tape storage position to its said given position.

6. A tape cassette comprising:
   a housing having a bottom wall with an upper surface,
   two tape reels rotatably mounted on the upper surface of said bottom wall,
   a guide member mounted on the upper surface of said bottom wall and having a tape engagement area on its periphery,
   tape extending from one of said tape reels around said tape engagement area of said guide member and to the other of said tape reels when said tape is in a normal operating position,
   tape lift off means mounted on the upper surface of said bottom wall,
   said tape lift off means being so constructed and arranged to move from a given position when said tape is in said normal operating position to a tape storage position where the tape lift off means disengages said tape from at least a portion of said tape engagement area of said guide member,
   means urging said tape lift off means into said tape storage position
   slot means extending inwardly from an outer edge of the bottom wall and being located in the upper surface of said bottom wall,
   means operably connected to and extending from said tape lift off means into said slot means,
   said means extending from said tape lift off means being positioned to move in a direction from an outermost edge of said slot means toward an innermost edge of said slot means to thereby move said tape lift off means from said tape storage position to said given position.

7. The tape cassette as recited in claim 6 wherein said tape lift off means is rotatably mounted on the upper surface of said bottom wall for rotatable movement around the periphery of said guide member from said given position to said tape storage position.

8. The tape cassette as recited in claim 7 wherein said tape lift off means comprises a pair of tape lift off members rotatably mounted on the upper surface of said bottom wall for rotatable movement in opposite directions around the periphery of said guide member.

9. The tape cassette as recited in claim 8 wherein said slot means comprises a pair of spaced apart generally parallel slots extending inwardly from the outer edge of the bottom wall and being located in the upper surface of said bottom wall and said means operably connected to and extending from said tape lift off means into said slot means comprises a post extending from each of said tape lift off members into a corresponding one of said slots, and said slots are wide enough to allow movement of said posts in an arcuatus path.

10. The combination of a tape cassette and a tape drive unit comprising:
    said tape cassette comprising a housing,
    two tape reels rotatably mounted on said housing,
    a guide member mounted on said housing and having a tape engagement area on its periphery,
    tape extending from one of said tape reels around said tape engagement area of said guide member and to the other of said tape reels when said tape is in a normal operating position, tape lift off means mounted on said housing, said tape lift off means being so constructed and arranged to move from a given position when said tape is in said normal operating position to a tape storage position where the tape lift off means disengages said tape from at least a portion of said tape engagement area of said guide member, means urging said tape lift off means into said tape storage position, and said drive unit having means operably engaging said lift off means and holding said lift off means in said given position.

11. The combination of a tape cassette and a tape drive unit as recited in claim 10 wherein said tape lift off means is rotatably mounted on said housing for rotatable movement around the periphery of said guide member from said given position to said tape storage position.

12. The combination of a tape cassette and a tape drive unit as recited in claim 11, wherein said tape lift off means comprises a pair of lift off members rotatably mounted on said housing for rotatable movement in opposite directions around the periphery of said guide member.

13. The combination of a tape cassette and a tape drive unit as recited in claim 10, further comprising:

brake means mounted on said housing for movement into engagement with at least one reel when said brake means is in a tape storage position and for movement out of engagement with said at least one reel when said brake means is in a tape operating position, and means, including means operatively connecting said tape lift off means to said brake means, to effect said movement of said brake means when said tape lift off means is moved to its tape storage position and is moved away from its tape storage position to its said given position.

14. The combination of a tape cassette and a tape drive unit comprising:

said tape cassette having a housing, said housing having a bottom wall with an upper surface, two tape reels rotatably mounted on the upper surface of said bottom wall, a guide member mounted on the upper surface of said bottom wall and having a tape engagement area on its periphery, tape extending from one of said tape reels around said tape engagement area of said guide member and to the other of said tape reels when said tape is in a normal operating position, tape lift off means mounted on the upper surface of said bottom wall, said tape lift off means being so constructed and arranged to move from a given position when said tape is in said normal operating position to a tape storage position where the tape lift off means disengages said tape from at least a portion of said tape engagement area of said guide member, means urging said tape lift off means into said tape storage position, slot means extending inwardly from an outer edge of the bottom wall and being located in the upper surface of said bottom wall, means operably connected to and extending from said tape lift off means into said slot means, said means extending from said tape lift off means being positioned to move in a direction from an outermost edge of said slot means toward an innermost edge of said slot means to thereby move said tape lift off means from said tape storage position to said given position, and said drive unit having means extending into said slot means and operably engaging said means which is operably connected to and extending from said lift off means and holding said lift off means in said given position.

15. The combination of a tape cassette and a tape drive unit as recited in claim 14 wherein said tape lift off means is rotatably mounted on the upper surface of said bottom wall for rotatable movement around the periphery of said guide member from said given position to said tape storage position.

16. The combination of a tape cassette and a tape drive unit as recited in claim 15 wherein said tape lift off means comprises a pair of tape lift off members rotatably mounted on the upper surface of said bottom wall for rotatable movement in opposite directions around the periphery of said guide member.

17. The combination of a tape cassette and a tape drive unit as recited in claim 16 wherein said slot means comprises a pair of spaced apart generally parallel slots extending inwardly from the outer edge of the bottom wall and being located in the upper surface of said bottom wall and said means operably connected to and extending from said lift off means into said slot means comprises a post extending from each of said tape lift off members into a corresponding one of said slots, and said slots are wide enough to allow movement of said posts in an arcuatus path.

18. The combination of a tape cassette and a tape drive unit as recited in claim 17 wherein said means of said drive unit extending into said slot means comprises a pair of spaced apart members extending into a respective one of said slots and engaging a corresponding said post.

19. The combination of a tape cassette and a tape drive unit comprising:

said tape cassette having a housing, said housing having a bottom wall with an upper surface, two tape reels rotatably mounted on said upper surface of said bottom wall, a guide member mounted on said upper surface of said bottom wall and having a tape engagement area on its periphery, tape extending from one of said tape reels around a tape engagement area of the periphery of said guide member and to the other of said tape reels when said tape is in a normal operating position, a pair of tape lift off members mounted on said upper surface of said bottom wall for rotatable movement in opposite directions about a common axis around the periphery of said guide member, said pair of tape lift off members being so constructed and arranged to rotate about the periphery of said guide member from a given position where said tape is in said normal operating position to a tape storage position, where the tape lift off members disengage said tape from at least a substantial portion of said tape engagement area of said guide member, means urging said tape lift off members into said tape storage position, a pair of spaced apart generally parallel slots extending inwardly from an outer edge of the bottom wall and being located in the upper surface of said bottom wall, a post extending downwardly from each of said tape lift off members into a corresponding one of said slots, said slots being wide enough to allow movement of said members in an arcuatus path, each of said members being positioned to move in a direction from an outermost edge of its corresponding said slot toward an innermost edge of said slot to thereby move said tape lift off means from said tape storage position to said given position, and said drive unit having a pair of spaced apart members extending into a respective one of said slots and engaging a respective post and holding said lift off members in said normal tape operating position.

20. A tape cassette comprising:

a housing, two tape reels rotatably mounted on said housing, a guide member mounted on said housing and having a tape engagement area on its periphery, tape extending from one of said tape reels around said tape engagement area of said guide member and to the other of said tape reels when said tape is in a normal operating position, tape lift off means mounted on said housing, said tape lift off means being so constructed and arranged to move from a given position when said tape is in said normal operating position to a tape storage position where the tape lift off means disengages said tape from at least a portion of said tape engagement area of said guide member, means urging said tape lift off means into said tape storage position, said housing having slot means, means operably connected to and extending from said tape lift off means into said slot means, said means extending from said tape lift off means being positioned to move in said slot means to thereby move said tape lift off means from said tape storage position to said given position.

21. A tape cassette as recited in claim 20 wherein said slot means extends inwardly from an outer edge of said housing and said means extending from said tape lift off means is positioned to move in a direction from an outermost edge of said slot means toward an innermost edge of said slot means to thereby move said tape lift off means from said tape storage position to said given position.

22. The combination of a tape cassette and a tape drive unit comprising:

said tape cassette comprising a housing, two tape reels rotatably mounted on said housing, a guide member mounted on said housing and having a tape engagement area on its periphery, tape extending from one of said tape reels around said tape engagement area of said guide member and to the other of said tape reels when said tape is in a normal operating position, tape lift off means mounted on said housing, said tape lift off means being so constructed and arranged to move from a given position when said tape is in said normal operating position to a tape storage position where the tape lift off means disengages said tape from at least a portion of said tape engagement area of said guide member, means urging said tape lift off means into said tape storage position, said housing having slot means, means operably connected to and extending from said tape lift off means into said slot means, said means extending from said tape lift off means being positioned to move in said slot means to thereby move said tape lift off means from said tape storage position to said given position, and said drive unit having means operably engaging said means which is operably connected to and extending from said lift off means and holding said lift off means in said given position.

23. The combination of a tape cassette and a tape drive unit as recited in claim 22 wherein said slot means extends inwardly from an outer edge of said housing and said means extending from said tape lift off means is positioned to be moved by said drive unit means in a direction from an outermost edge of said slot means toward an innermost edge of said slot means to thereby move said tape lift off means from said tape storage position to said given position.

* * * * *